April 22, 1941.　　　　J. B. HADAWAY　　　　2,238,900
ARTIFICIAL BAIT
Filed March 15, 1939

INVENTOR.
John B. Hadaway
by his attorneys
Fish, Hildreth, Cary & Jenney

Patented Apr. 22, 1941

2,238,900

UNITED STATES PATENT OFFICE 2,238,900

ARTIFICIAL BAIT

John B. Hadaway, Swampscott, Mass.; Florence S. Hadaway, executrix of said John B. Hadaway, deceased Application March 15, 1939, Serial No. 261,985

1 Claim. (Cl. 43—49)

The present invention relates to fishing tackle, and more particularly to an artificial lure or bait.

In my co-pending application, Serial No. 141,712, filed May 10, 1937, which has eventuated in Patent No. 2,154,333, dated May 9, 1939, I have shown a bait holder and hook designed primarily for use with live bait, such as minnows, but also adapted for use with artificial bait of proper design. It is the object of the present invention to provide an artificial bait intended particularly for use with such bait holder and hook, although not necessarily limited to use therewith, the artificial bait being so constructed and arranged that it will be securely held upon the bait holder and yet may be easily and quickly removed to permit the substitution of artificial bait of different form and sizes or color or, if desired, of a live minnow or other similar bait.

A further object of the present invention is to provide an artificial bait the shape of curvature of which will be determined by the form or curvature of the bait holder with which it is used so that by providing bait holders of different shapes and curvature, the fisherman may, by selection of the proper bait holder with which the artificial bait is to be used, secure a proper or desired curvature or shape of his bait to impart thereto, as it is drawn through the water, the most life-like or attractive movements, these depending to a large extent upon the degree or kind of curvature of the bait.

To the above ends the present invention comprises an artificial bait formed with a passage therethrough to receive the impaling needle of the bait holder, and provided with suitably shaped and positioned transverse passages to receive the impaling prongs or other suitable devices carried by the bait holder.

Another feature of the present invention consists in forming the artificial bait in whole or in part of yielding or resilient material so that the bait will assume a shape or curvature determined by the shape or curvature of the particular impaling needle of the bait holder with which it is used.

Figure 1:
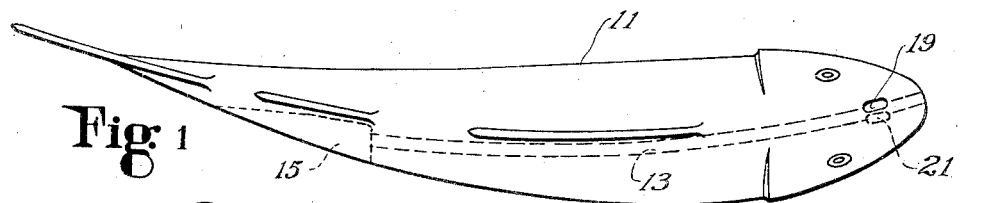
Figure 2:
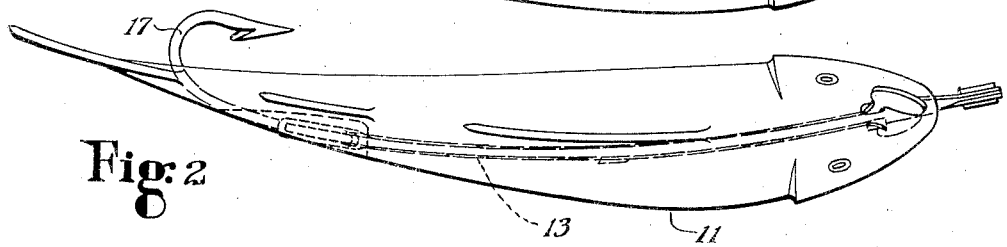
Figure 3:
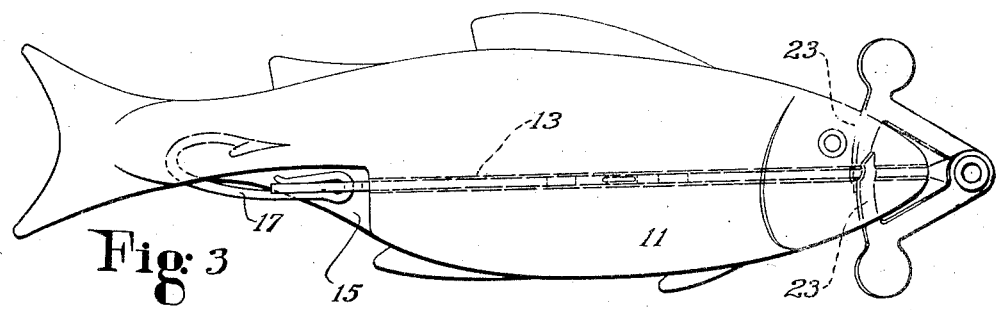
Figure 4:
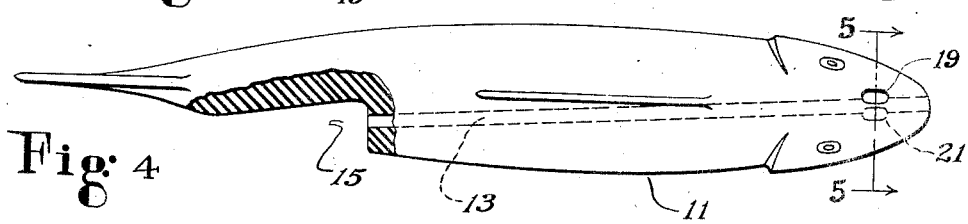
Figure 5:
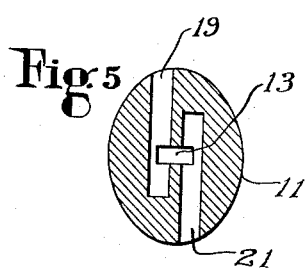
Figure 6:
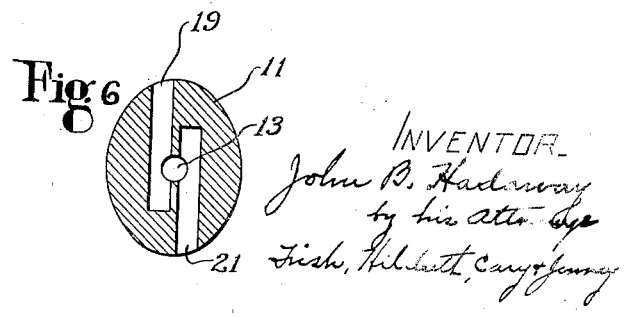

In the accompanying drawing, which illustrates what is now considered to be the preferred form of the present invention, Fig. 1 is a top plan view of an artificial bait in the form of a somewhat curved minnow, separate and detached from the bait holder, while Fig. 2 is a similar view with the bait mounted upon the bait holder of my prior application; Fig. 3 is a side elevation showing such a minnow and bait holder, and Fig. 4 is a top plan of a straight artificial minnow with a straight passage therethrough for the impaling needle; Fig. 5 is a transverse vertical section on an enlarged scale on line 5—5 of Fig. 4; and Fig. 6 is a similar view of a modification adapted for use with an impaling member of somewhat different cross-section.

The artificial bait, which for the purpose of illustration is in the form of a minnow, although the invention is equally applicable for other and different forms and types of artificial bait, may conveniently be formed of molded rubber, and is of life-like form and color or painted in life-like shades or other colors which make it attractive to fish. In the minnow 11 of Fig. 1 the body of the minnow is slightly curved, as shown, and a correspondingly curved longitudinal passage 13 extending from the front end or mouth portion thereof to a point at the side of the body opposite the second dorsal fin. This passage may be either rectangular in cross-section, as shown in Fig. 5, or circular, as shown in Fig. 6, being preferably of the same cross-sectional shape as the impaling needle upon which it is to be mounted. The rear end of the passage 13 terminates in a recess 15 of suitable size and shape to receive the shank and eye of the hook 17 such, for example, as that shown in my co-pending application.

Near the front end of the passage 13 the bait is formed with transverse passages 19 and 21, the former entering from the top and the other from the bottom of the head portion of the bait. These passages are for the purpose of receiving the impaling prongs 23 of the bait holder, see Fig. 3, and are so arranged and positioned that the prongs may be locked over the shank of the impaling needle, as shown in Fig. 3, and as described in more detail in my said application.

The impaling needle shown in Fig. 2 might be initially curved to the shape shown, or might be initially straight but formed of such resilient material that it would readily conform to the curved shape of the passage 13.

In Fig. 4 the artificial minnow is shown as initially straight, with a straight passage therethrough. Such a minnow may be used with a straight impaling needle to give a substantially straight bait throughout its length, or could be used with impaling needles of various curvatures, and of sufficient stiffness to impart the desired bend or curvature to the flexible body of the bait. Thus a fisherman by providing himself with several bait holders having impaling needles of different curvatures, and also with several different artificial baits varying in kind, size, and color, may have a very considerable number of artificial baits at his commond which may easily be made up, as it were, and tried one after another, until finally one is found of the best kind, size, color and shape, to most effectively attract the fish.

When my improved bait is to be used with the bait holder of my said application, after the desired form of bait has been selected and the proper type of impaling needle chosen, the impaling prongs 23 are opened upon their pivots and the needle carried through the longitudinal passage until the end appears in the recess at the termination of the passage. The impaling prongs are then forced inwardly through their appropriate passages in the head of the bait and locked upon the shank of the needle. A hook of the proper type and size is then selected and attached to the rear end of the impaling needle in the manner described in my application. The bait and hook are now ready for use.

If no fish are attracted by the bait as made up, it is a simple matter for the fisherman to detach the hook, open the prongs and remove the impaling needle from the bait and either change the impaling needle for one of a different shape, or substitute a different form or size of bait. Of course the fisherman is free to change from artificial to natural bait and vice versa at any time.

While I have shown and described the bait as formed with transverse openings of a substantial size to permit the free and easy entrance therein of the impaling prongs, it is not necessary that these passages should be of the exact size of the prong, as obviously there may be wide variations in the size of these passages with respect to the cross-section of the prongs, particularly when the bait is formed of rubber or other yielding material, without interfering with the proper positioning of the latter.

Nor is the present invention limited to the use of an artificial bait of the character described with only the bait holder of my said application, but may be used with equal facility with many other suitable types and kinds of holders.

Having thus described the present invention, what is claimed is:

An artificial bait provided with a passage therethrough to receive the impaling member of a bait holder, said bait being formed with a hook receiving recess at the rear end of said passage, and with an intersecting transverse passage adjacent the front end of said passage to receive securing means for securing the bait to the bait holder.

JOHN B. HADAWAY.

CERTIFICATE OF CORRECTION.

Patent No. 2,238,900. April 22, 1941.

JOHN B. HADAWAY.

It is hereby certified that error appears in the printed specification of the above numbered patent requiring correction as follows: Page 1, first column, line 6, for the patent number "2,154,333" read --2,157,333--; page 2, first column, line 4, for "commond" read --command--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.